May 4, 1943.  I. I. SIKORSKY  2,318,260
HELICOPTER AND CONTROLS THEREFOR
Filed April 9, 1940  4 Sheets-Sheet 1

Fig. 1.

INVENTOR
Igor I. Sikorsky
BY Harris G. Luther
ATTORNEY

May 4, 1943.  I. I. SIKORSKY  2,318,260
HELICOPTER AND CONTROLS THEREFOR
Filed April 9, 1940   4 Sheets-Sheet 3

Fig. 4.

INVENTOR
Igor I. Sikorsky
BY Harris G. Luther
ATTORNEY

May 4, 1943.　　　　I. I. SIKORSKY　　　　2,318,260
HELICOPTER AND CONTROLS THEREFOR
Filed April 9, 1940　　　　4 Sheets-Sheet 4

Fig.5.

INVENTOR
Igor I. Sikorsky
BY Harris G. Luther
ATTORNEY

Patented May 4, 1943

2,318,260

UNITED STATES PATENT OFFICE 2,318,260

HELICOPTER AND CONTROLS THEREFOR

Igor I. Sikorsky, Trumbull, Conn., assignor to United Aircraft Corporation, East Hartford, Conn., a corporation of Delaware Application April 9, 1940, Serial No. 328,621

22 Claims. (Cl. 244—17)

This invention relates to improvements in aircraft and has particular reference to an improved aircraft of the direct-lift type ordinarily referred to as a helicopter.

An object of the invention resides in an improved control for a direct-lift aircraft of the character referred to.

A further object resides in the provision of a direct-lift aircraft of the character referred to having a plurality of rotary aerodynamic instrumentalities and means for controlling said instrumentalities to provide positional and directional control of said aircraft in various directions in space.

A still further object resides in the provision in a direct-lift aircraft of the character indicated having one or more engines, and a main lifting rotor, of a pair of auxiliary rotors for providing lateral and pitching control and providing additional lift for said aircraft and a third auxiliary rotor for balancing torque reactions imposed on said aircraft and providing directional control thereof.

An additional object resides in the provision in a direct-lift aircraft of the character indicated having one or more engines and a main lifting rotor, of auxiliary rotors, comprising propellers disposed in two planes intersecting substantially at right angles to each other, to provide pitching and rolling control and torque balancing and directional control for said aircraft and additional lift for assisting the sustaining power of the main rotor.

Other objects and advantages will be more particularly pointed out hereinafter or will become apparent as the description proceeds.

In the accompanying drawings, in which like reference numerals are used to designate similar parts throughout, there is illustrated a suitable mechanical arrangement for the purpose of disclosing the invention. The drawings, however, are for the purpose of illustration only and are not to be taken as limiting or restricting the invention as it will be apparent to those skilled in the art that various changes in the illustrated arrangement may be resorted to without in any way exceeding the scope of the invention.

Figure 1:
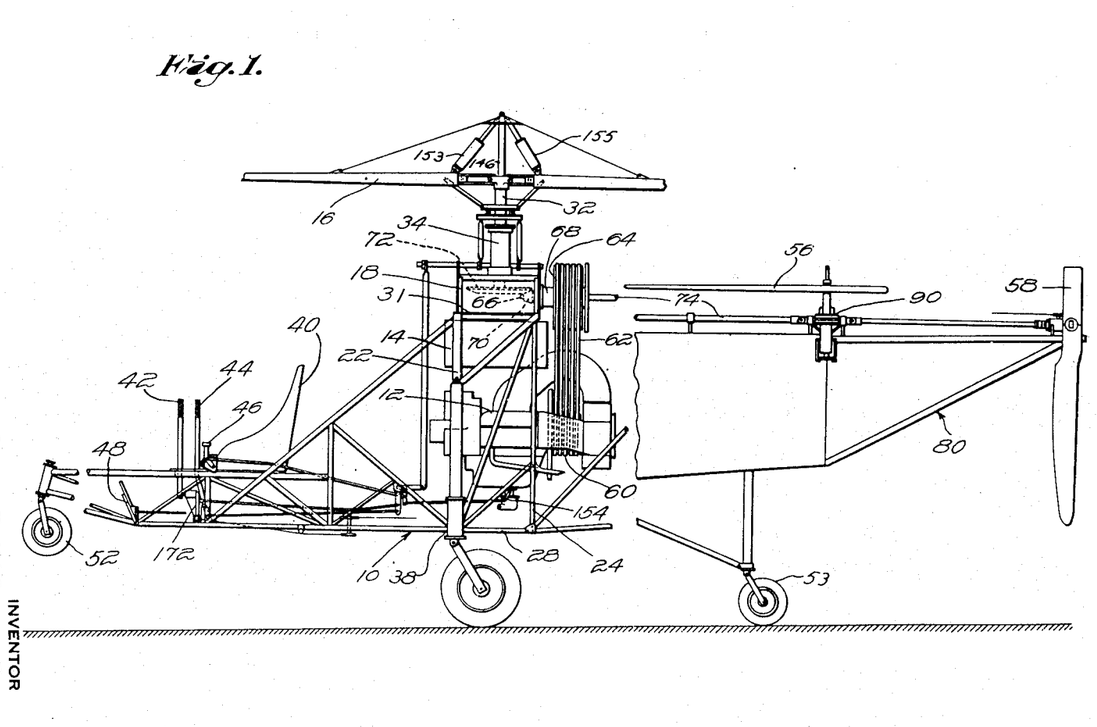
Fig. 1 is a longitudinal elevational view of a direct-lift aircraft or helicopter constructed according to the invention.
Figure 2:
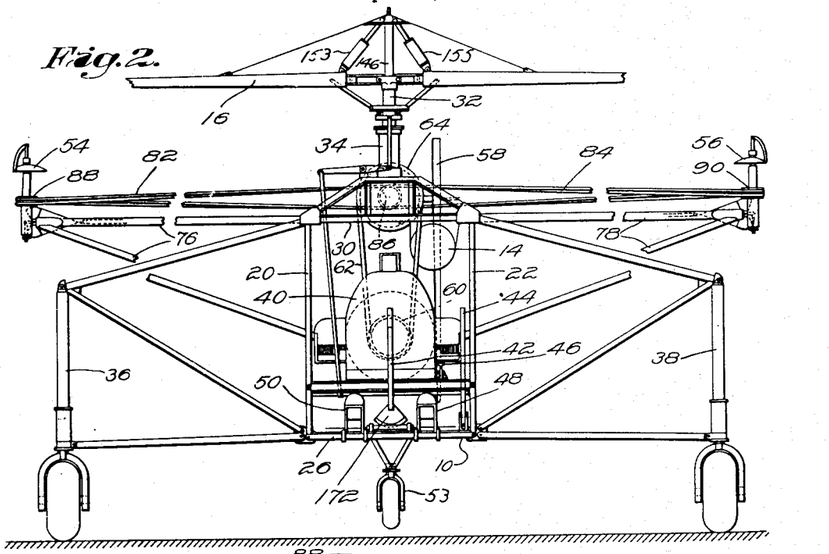
Fig. 2 is a front-elevational view of the aircraft illustrated in Fig. 1.

Referring to the drawings in detail, and particularly to Figs. 1 and 2, the device includes a frame or fuselage, generally indicated at 10, which may be formed up of structural members in any suitable or convenient manner such, for example, as by welding together tubular sections of suitable lengths arranged to constitute a rigid frame structure. This frame or fuselage may conveniently include a pilot compartment or support, an engine and main rotor support and a rearwardly extending support for the auxiliary rotors and may, if desired, be covered to provide a hollow body having one or more compartments.

The portion of the frame supporting the engine 12, fuel tank 14, main rotor 16 and transmission gear 18 may conveniently comprise a group of four relatively sturdy upright members three of which are indicated at 20, 22, and 24 connected together at their ends by suitable cross members some of which are indicated at 26, 28, 30 and 31 and with suitable diagonal brace members to constitute a rigid box like form. The engine is supported near the bottom of this structure, the fuel tank immediately above the engine, the transmission gear case on top of the structure and the main rotor is supported above the gear case by a shaft 32 which extends through a sleeve 34 secured on the top of the gear case and provided with suitable end bearings for maintaining the shaft 32 in alignment with the sleeve and supporting the remainder of the structure from the main rotor when the aircraft is in flight. The two main landing gear structures 36 and 38 are directly connected to this main rigid box like portion so that the weight of the engine and main rotor may be transmitted directly to the landing gear when the craft is brought to a landing, suitable shock members being provided in the landing gear to absorb the landing impact. The pilot support is attached to the forward side of the box like structure and supports a seat 40 located in convenient proximity to the manual controls 42, 44, 46, 48 and 50 and this structure may carry a forward landing wheel 52 to insure the safety of the craft under unfavorable landing conditions.

A tail structure comprising three or more longitudinal members and a number of diagonal brace members is secured to the rear of the box like structure and provides a support for the control instrumentalities 54, 56 and 58 the construction and operation of which will be subsequently described. This structure may also carry a rear landing wheel 53.

The seat 40 and control instrumentalities 54, 56 and 58 are spaced from the rotational axis of the main rotor 16 so as to provide a substantially balanced arrangement of weights, so that, with the relatively heavy engine and fuel tank supported directly beneath the main rotor in the manner indicated above, the machine will have a high degree of inherent stability when supported from the main rotor in flight.

The engine drives a pulley 60 which is connected by suitable means, such as the belt drive 62, with a second pulley 64 mounted on a shaft 66 supported by suitable bearings in a case 68 attached to one side of the gear case 18, a one-way driving connection, not illustrated, preferably being interposed between the pulley 64 and the shaft 66. The shaft 66 projects within the gear case and is there provided with a beveled gear 70 which meshes with a bevel gear 72 secured on the lower end of the shaft 32 to drive the main rotor 16 and is also connected with a shaft 74 which extends rearwardly along the tail structure to operative connections with the flight control propellers 54, 56 and 58, a positive driving connection being provided between the main rotor and the auxiliary rotors. For a more detailed description of this driving connection, reference may be had to my co-pending United States application Serial No. 328,225, filed April 6, 1940. For direct-lift aircraft.

Figure 3:
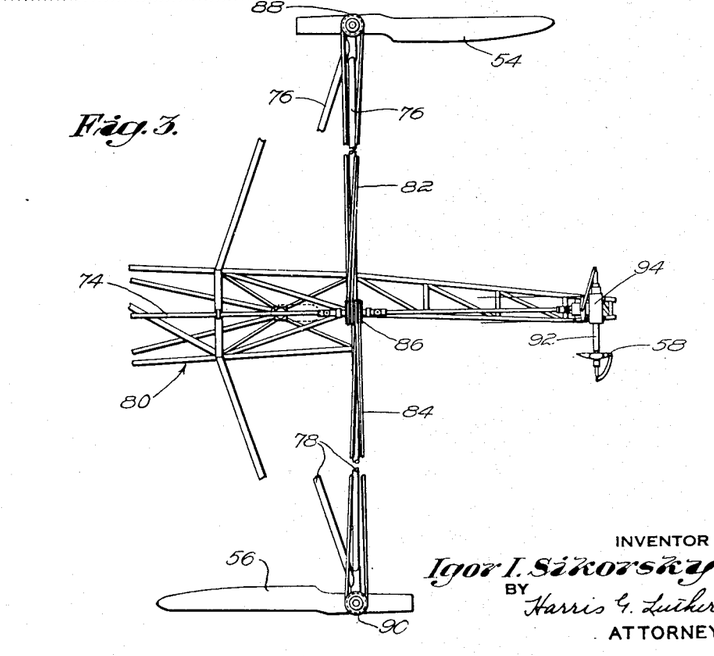
Fig. 3 is a plan view of the rearward portion of the air-craft particularly illustrating the flight control instrumentalities.

The auxiliary rotors 54 and 56 are supported at the ends of respective outriggers 76 and 78, as particularly shown in Fig. 3, secured to the tail structure, generally indicated at 80, near its rearward end and are driven from the shaft 74 by some suitable means such as the respective belt drives 82 and 84 which pass over a pulley 86 on the shaft 74 and over respective pulleys 88 and 90 drivingly connected with the rotor blades 54 and 56 respectively. The rotor blade 58 is mounted on a drive shaft 92 which extends into a gear box 94 carried at the rearward end of the tail structure 80 which gear box also receives the rearward end of the shaft 74 and contains a pair of beveled gears for transmitting the rotation of the shaft 74 to the shaft 92. For a more detailed description of the drive for the motor 58 reference may be had to my co-pending United States application Serial No. 328,225, referred to above.

The blades on all of the auxiliary rotors 54, 56 and 58 are mounted so that the pitch of the blades can be varied over a relatively large angle between a positive and a negative value and the pitch of these blades is controlled by both manual and automatic means in order to obtain flight control and stability of the aircraft. As the control instrumentalities are particularly shown in Figs. 4 and 5, reference may now be had to those figures for a description thereof.

Figure 4:
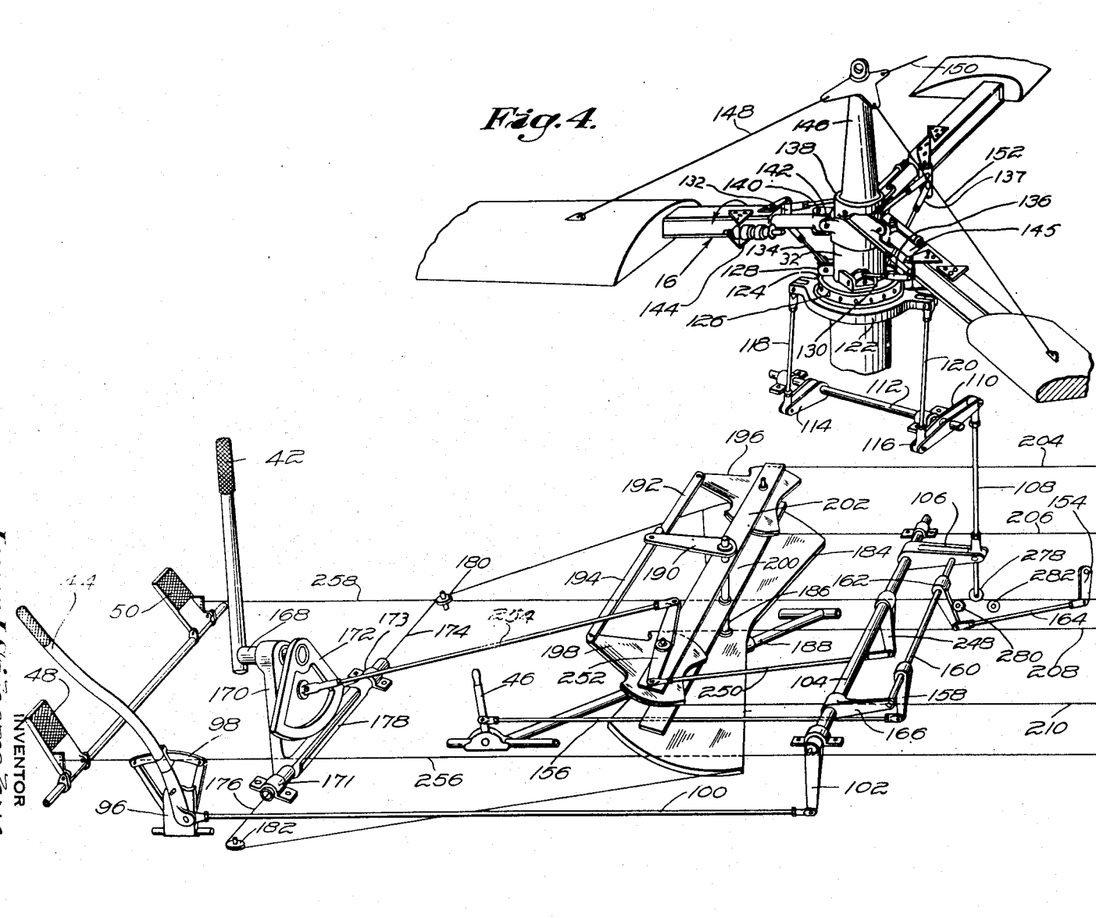
Fig. 4 is a diagrammatic perspective view of the forward portion of the control mechanism for the aircraft.

The pitch of the main rotor is variable over a substantial range of positive and small negative angles and is changed by the manual lever 44 which is pivoted to a bracket 96 secured to the fuselage and retained against accidental movement by a quadrant 98. The lower end of this lever is connected by a link 100 with an arm 102 on a transverse shaft 104 which carries a second arm 106 connected by a link 108 with an arm 110 fixed on a shaft 112 mounted in suitable bracket members secured to the top of the gear case 18. This shaft 112 has two arms 114 and 116 connected by links 118 and 120 to a member 122 which surrounds the shaft 32 immediately below the main rotor and is slidable axially on the shaft. A base plate 124 is connected to the member 122 by the anti-friction thrust bearing 126 and carries a hinge bracket, as indicated at 128 and 130, for each blade of the main rotor 16. Each hinge bracket on the plate 124 is connected to a bracket, as indicated at 132, on the respective main rotor blade by a pivoted link, as indicated at 134, 136 and 137. Each main rotor blade is connected to a bracket 138 on the end of the shaft 32 by a universal connection including crossed pivots, as indicated at 140 and 142, and these main rotor blades are resiliently maintained in their relative radial positions by torque links, one of which is indicated at 144. A pivotal connection, one of which is indicated at 145 is interposed between the inner end of each blade and the respective universal joint connection to provide freedom of pitch changing rotational movements of the blades about their major axes, the construction being such that when the member 122 is moved along the shaft 32 the links, as indicated at 134 and 136, will act to rotate the blades about their longitudinal axes to change the pitch thereof. For a more detailed description of this blade mounting and control feature reference may be had to my co-pending United States application Serial No. 328,225, referred to above.

While the blades are retained in operative position during flight by the centrifugal forces acting thereon, means such as the tower 146 extending upwardly from the end of the shaft 32 and the cables 148, 150 and 152 may be provided to prevent the blades from drooping when the rotor is not rotating. If desired, a shock strut or dashpot two of which are indicated at 153 and 155, may be interposed between each blade and the tower 146 to damp out vibrational movements of the blades induced by landing shocks or other causes.

The manual throttle lever 46 is connected with the engine throttle 154 by a link 156 which extends to the free end of a lever 158 mounted on a shaft 160 which carries a second lever arm 162 the free end of which is connected with the throttle arm 154 by a link 164 so that movements of the lever 46 will be transmitted to the throttle arm 154. The shaft 160 is carried by the arm 106 and an arm 166 mounted on the shaft 104 so that the shaft 160 is moved whenever the shaft 104 is rotated by the main rotor pitch controlling lever 44, the arrangement being such that whenever the lever 44 is moved to decrease the pitch of the main rotor the throttle will be actuated to reduce the engine power and conversely, when the lever is moved to increase the pitch of the main rotor the throttle will be actuated to increase the engine power.

Figure 5:
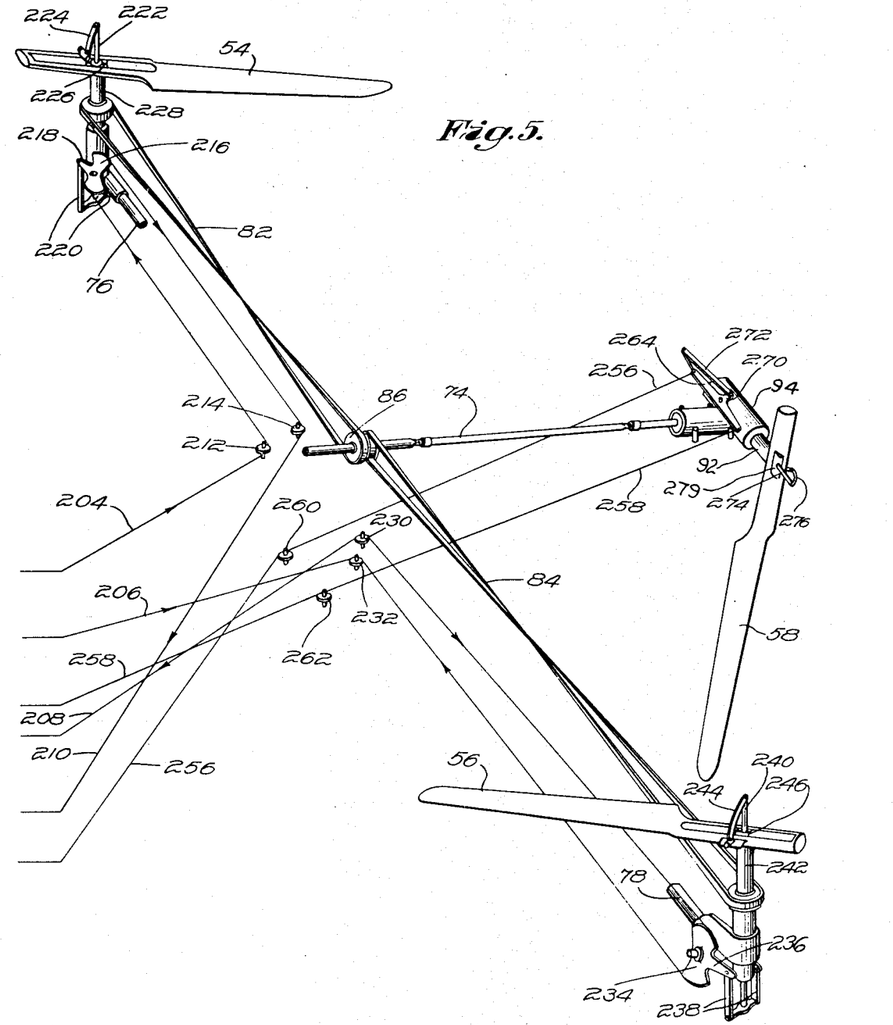
Fig. 5 is a diagrammatic perspective view of the rearward portion of the control apparatus.

The control column 42 is mounted on one end of a stub shaft 168 which has a supporting bearing in a bracket 170 that is pivotally mounted on the transversely arranged bearings 171 and 173, and carries a quadrant 172 on its opposite end. This quadrant has attached thereto the ends of oppositely acting cables 174 and 176 which cables pass through the bracket supporting base tube 178 the ends of which are mounted in the bearings 171 and 173, and over respective sheaves 180 and 182 and have their opposite ends attached to the ends of a lever bar 184 which is rigidly secured at or near its center to a vertical shaft 186 the lower end of which is mounted in a bearing on a member of the fuselage, such as the transverse strut 188. From this description it is apparent that movements of the control column 42 laterally will operate the cables 174 and 176 in a manner to swing the lever bar 184 and rotate the shaft 186. At its upper end the shaft 186 carries a lever arm 190 the free end of which is connected by the respective links 192 and 194 to the cable sectors 196 and 198 pivotally supported at the ends of a pair of parallel lever bars 200 and 202 which are pivotally mounted at or near their centers in bearings on the shaft 186. A pair of cables 204 and 206 are connected at their ends to the opposite sides of the sector 196 and a similar pair of cables 208 and 210 are connected at their ends to the opposite sides of the sector 198 all of which cables lead rearwardly to operative connections with the pitch controlling mechanism of the outrigger supported auxiliary rotors 54 and 56. Specifically, the cables 204 and 210 pass around adjacent guide sheaves 212 and 214, respectively, and are connected at their ends to the opposite sides of a sector 216 pivotally mounted on the casing which supports the bearings for the rotor 54. This sector is provided with an arm 218 connected by a link 220 with the lower end of a rod 222 which passes through the hollow drive shaft which supports the rotor blade 54 and is connected at its upper end by a suitable link 224 with the leading edge of the rotor blade. The blade is mounted on its drive shaft by means of a gimbal joint 226 which permits movements of the blade relative to the shaft in pitch changing and free coning directions. From this description it is apparent that movement of the cables 204 and 210 rotate the sector 216 to change the pitch of the rotor blade 54 by moving the rod 222 through the rotor drive shaft 228 and moving the connection between the link 224 and the blade relative to the gimbal joint 226. The cables 206 and 208 are similarly guided around sheaves 230 and 232 and connected at their ends to the opposite sides of a sector 234 pivotally mounted on the support for the rotor 56 and having an arm 236 connected by the link structure 238 with the end of rod 240 which passes through the hollow drive shaft 242 for the rotor 56 and through the rotor blade and is connected at its upper end by means of a link 244 with the leading edge of the blade so that rotation of the sector 234 by the cables 206 and 208 will move the blade 56 about its gimbal joint 246 to change the pitch of the blade.

This arrangement is such that, although the arm 190 rotates both sectors 196 and 198 in the same direction the pull exerted by the cables on the secondary sectors 216 and 234 will be in opposite directions so that the pitch of one of the rotors 54 or 56 will be increased and the pitch of the alternate rotor will be decreased, the differential pitch change in either direction depending upon the direction of movement of the arm 190 by the lever 184. This differential pitch change of the outrigger mounted rotors will produce a rolling moment on the aircraft which will cause the aircraft to bank in the direction in which the control column 42 is moved, or will restore the aircraft from a laterally inclined to a vertical position.

As two cables are connected to each of the primary sectors 196 and 198 the forces exerted by these sectors will be substantially balanced and there will be little tendency for the sector carrying arms 200 and 202 to rotate about the shaft 186 under the rotational force exerted by the arm 190, however, any residual force tending to rotate the sector carrying levers instead of rotating the sectors relative to the levers is resisted by a connection including the arm 248 on the shaft 104, the link 250 connecting this arm with a double ended lever 252 pivotally mounted on the pivotal support of the sector 198 and the link 254 connecting the opposite end of this lever with the bracket 170 at a position spaced from the axis of the base tube 178. As the arm 248 is relatively fixed except when the shaft 104 is moved by the lever 44, the pivot of the sector 198 and lever 252 may be fixed by holding the control column 42 against fore and aft movements so that the sector carrying levers 200 and 202 will not move about their pivotal mounting.

When the control column 42 is given a fore and aft movement the link 254 will be given an axial movement which will move the pivot mounting of the lever 252 and sector 198 and swing the lever bars 200 and 202 about their pivotal mounting on the shaft 186. When the sector supporting lever members 200 and 202 are rotated about the shaft 186 one pair of cables 204—206 and 208—210 will be slackened and the other pair will be tightened. This operation will cause a rotational movement of both of the secondary sectors 216 and 234 in the same direction to increase or decrease the pitch of the rotor blades 54 and 56 simultaneously to provide a pitching moment on the aircraft to cause the aircraft to nose up or down or to restore it from a down-nose or up-nose condition to an even keel.

Because of the connection including the arm 248 and link 250 between the shaft 104 and the lever 252, whenever the lever 44 is moved to change the pitch of the main rotor the pitch of the auxiliary rotors 54 and 56 will be automatically changed if the control column 42 remains in the same fore and aft position. This arrangement results in simultaneously increasing the lift in proportionate amounts at three spaced apart points on the aircraft. Since the auxiliary rotors 54 and 56 provide a material portion of the sustaining lift for the aircraft in order to render the control functions of these rotors more sensitive and accurate, the provision for simultaneously changing the lift of these auxiliary rotors whenever the lift of the main rotor is changed materially improves the stability of the aircraft and tends to keep the aircraft on an even keel during vertical movements thereof. Thus, whenever the pitch of the main rotor is changed to vary the lift of the aircraft the pitch of the two auxiliary sustaining rotors is simultaneously changed and the engine power output is changed at the same time, all in direct relation with each other so that the rotational speed of all of the rotors may remain substantially constant while the aircraft moves vertically up or down as the lift of its sustaining rotors is increased or decreased. While the lever 44 has been illustrated as a hand controlled lever, this lever may be provided as a foot pedal if desired, as shown in my co-pending United States application Serial No. 328,225, referred to above, or both a hand controlled and a foot controlled lever for accomplishing the same function may be provided, if desired, in order to facilitate the manual control of the aircraft.

A cable 256 is connected to the foot pedal 48 and a similar cable 258 is connected to the foot pedal 50. These cables lead rearwardly past respective guide sheaves 260 and 262 and are connected at their rearward ends to the opposite ends of a lever 264 pivotally mounted on the gear box 94 which transmits power from the rear drive shaft 74 through the hollow drive shaft 92 to the vertically disposed rotor blade 58 mounted at the rear of the tail structure 80. The lever 264 has an arm 270 connected by a link structure 272 to the end of a rod 274 which projects through the hollow drive shaft 92 and rotor blade 58 and is connected by means of a link 276 with the leading edge of the rotor blade 58 so that movements of the lever 264 by the cables 256 and 258 will change the pitch of the rotor blade 58, this blade being mounted on a gimbal joint 279 to permit pitch changing and free coning movements thereof. For a more detailed description of the gear drive and pitch controlling mechanism for this rear rotor blade reference may be had to my copending United States application Serial No. 328,225, referred to above.

Since the rotor 58 not only provides the directional control for the aircraft in flight but also balances the reaction to the torque applied to the main sustaining rotor, it may be desirable to provide means for automatically changing the pitch of the rotor 58 when the pitch of the main rotor is changed. This may be accomplished by various means, for example, by connecting a pulley or sheave 278 to an extension of the main rotor pitch controlling shaft 108 so that the pulley bears upon the cable 258 between two fixed pulleys 280 and 282 in such a manner that the cable will be looped between these three pulleys to apply tension thereto and increase the pitch of the rotor 58 whenever the pitch of the main rotor 16 is increased, and will be correspondingly slacked to decrease the pitch of the rotor 58 whenever the pitch of the main rotor is decreased, whereby the torque reaction effect of the rear rotor will always be in proportion to the torque reaction of the main rotor. This arrangement will not interfere in any way with the complete manual control of the rear rotor by the pedals 48 and 50.

From the above description it will be apparent that there has been provided a direct lift aircraft having a main rotor whose axis passes through or near to the combined center of gravity of the aircraft, preferably being located somewhat ahead of said combined center of gravity, a pair of auxiliary lifting rotors positioned to the rear of the main rotor and offset equal distances from the center line of the aircraft and being both differentially and coordinately controllable to provide rolling and pitching control for said aircraft as well as to provide a material amount of aircraft sustaining lift; and a third propeller rotating in a plane at right angles to the plane of rotation of the other three rotors and controllable to balance the torque reaction of the other three rotors and to also provide directional control for the aircraft; and a set of manual controls including a single control column for controlling said laterally spaced rotors both coordinately and differentially, a single manual control for the pitch of said main rotor, and a single pair of foot pedals for the control of said torque balancing and directional control rotor; and an automatic coordination between the controls of said various rotors and the rotor driving engine to provide a condition of high stability for the aircraft in flight and sensitive and accurate control action for said various rotors.

While a suitable mechanical arrangement has been hereinabove described and illustrated in the accompanying drawings for the purpose of disclosing the invention, it is to be understood that the invention is not limited to the particular arrangement so illustrated and described, but that various changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a direct lift type aircraft having an engine driven main sustaining rotor so disposed that its axis passes adjacent to the combined center of gravity of said aircraft, a pair of auxiliary sustaining rotors spaced from said main rotor on the opposite side of said center of gravity and symmetrically located relative to the longitudinal center line of said aircraft, a third auxiliary rotor having a plane of rotation intersecting the planes of rotation of said sustaining rotors, and independently operable means for controlling the thrust effect of said main rotor, said pair of auxiliary sustaining rotors, and said third auxiliary rotor and mechanism operatively connected with and movable by said main rotor controlling means for varying the power output of said engine as said main rotor controlling means is moved to change the thrust effect of said main sustaining rotor.

2. In a direct lift of aircraft having an engine driven main sustaining rotor so disposed that its axis passes adjacent to the combined center of gravity of said aircraft, a pair of auxiliary sustaining rotors spaced from said main rotor and symmetrically located relative to the longitudinal center line of said aircraft, a third auxiliary rotor having a plane of rotation intersecting the planes of rotation of said sustaining rotors, and independently operable means for controlling the thrust effect of said main rotor, said pair of auxiliary sustaining rotors, and said third auxiliary rotor, and mechanism operatively connected with and movable by said main rotor controlling means automatically varying the thrust effect of said auxiliary sustaining rotors in the same direction as the change in thrust effect of said main rotor whenever the thrust effect of said main-rotor is varied.

3. In a direct lift type aircraft having an engine driven main sustaining rotor so disposed that its axis passes adjacent to the combined center of gravity of said aircraft, a pair of auxiliary sustaining rotors spaced from said main rotor and symmetrically located relative to the longitudinal center line of said aircraft, a third auxiliary rotor having a plane of rotation intersecting the planes of rotation of said sustaining rotors, independently operable means for controlling the thrust effect of said main rotor, said pair of auxiliary sustaining rotors, and said third auxiliary rotor, and mechanism operatively connected with and movable by said main rotor controlling means automatically varying the thrust effect of said third auxiliary rotor whenever the thrust effect of said sustaining rotors is varied to render said third auxiliary rotor effective to balance the reaction to the torque imposed on said sustaining rotors.

4. In a direct lift type aircraft having an engine driven main sustaining rotor so disposed that its axis passes adjacent to the combined center of gravity of said aircraft, a pair of auxiliary sustaining rotors spaced from said main rotor and symmetrically located relative to the longitudinal center line of said aircraft, a third auxiliary rotor having a plane of rotation intersecting the planes of rotation of said sustaining rotors, independently operable means for controlling the thrust effect of said main rotor, said pair of auxiliary sustaining rotors, and said auxiliary rotor, and mechanism operatively connected with and actuated by movement of said main rotor controlling means automatically varying the thrust effect of said auxiliary sustaining rotors and said third auxiliary rotor whenever the thrust effect of said main rotor is varied to coordinate the lift forces applied to said aircraft at various locations and balance the reaction to the torque imposed on said sustaining rotors.

5. In a direct lift type aircraft having an engine driven main sustaining rotor so disposed that its axis passes adjacent to the combined center of gravity of said aircraft, a pair of auxiliary sustaining rotors spaced from said main rotor and symmetrically located relative to the longitudinal center line of said aircraft, a third auxiliary rotor having a plane of rotation intersecting the planes of rotation of said sustaining rotors, independently operable means for controlling the thrust effect of said main rotor, said pair of auxiliary sustaining rotors, and said auxiliary rotor, mechanism operatively connected with and actuated by movement of said main rotor controlling means automatically varying the thrust effect of said auxiliary sustaining rotors and said third auxiliary rotor whenever the thrust effect of said main rotor is varied to coordinate the lift forces applied to said aircraft at various locations and balance the reaction to the torque imposed on said sustaining rotors, and mechanism also actuated by movement of said main rotor controlling means for automatically coordinating the engine power output with the magnitude of the thrust effects of said sustaining rotors.

6. In an aircraft having a main sustaining rotor, one or more auxiliary sustaining rotors, and one or more directional control rotors, respective means for changing the pitch of said rotors, manually operable means each operatively connected with its respective rotor for controlling the pitch of said rotors, and means operatively interconnecting said main rotor pitch control and the pitch controls of said auxiliary sustaining rotors for automatically synchronizing the pitch changes of said auxiliary sustaining rotors with pitch changes of said main sustaining rotor.

7. In an aircraft having a plurality of lift rotors, a torque reaction rotor, and an engine power control, means operatively connected with one-lift rotor for changing the pitch thereof, means operatively connected with said means for simultaneously changing the pitch of the remaining lift rotors, the pitch of the reaction rotor and the setting of the engine power control to maintain substantially the same engine speed and counteract any tendency of the aircraft to change its attitude while changing its altitude.

8. In a direct-lift type aircraft having an engine driven main sustaining rotor so disposed that its axis passes adjacent to but to one side of the combined center of gravity of said aircraft, a pair of engine driven auxiliary sustaining rotors having axes substantially parallel to but spaced from said main rotor axis and located on the opposite side of said center of gravity from, but at a greater distance therefrom than, said main rotor axis and symmetrically horizontally displaced relative to a horizontal longitudinal center line passing through said center of gravity and said main rotor axis, a third engine driven auxiliary rotor spaced horizontally to one side of said main rotor and having a plane of rotation intersecting the planes of rotation of said sustaining rotors, and means for controlling the thrust effect of all of said rotors.

9. In a direct-lift type aircraft having an engine driven main sustaining rotor with an upwardly directed axis so disposed that said axis passes adjacent to but to one side of the center of gravity of said aircraft at a point in the horizontal plane containing said center of gravity, an auxiliary main rotor torque counteracting and yaw control means mounted on an axis spaced from the axis of the main rotor, a pair of horizontally spaced engine driven auxiliary sustaining rotors horizontally spaced from said main rotor and having upwardly directed axes horizontally spaced from the opposite sides of a plane including said main rotor axis and said center of gravity and spaced a greater distance from said center of gravity than said main rotor axis and symmetrically located relative to and at the same distance from said main rotor, and means operatively connected with said main rotor for controlling the thrust effect thereof and independently operable means operatively connected with said pair of auxiliary sustaining rotors for controlling the thrust effect thereof.

10. In a direct-lift aircraft, an engine driven main sustaining rotor arranged to rotate about a vertical axis which passes adjacent to but to one side of the center of gravity of said aircraft, at a point in the horizontal plane containing said center of gravity, means associated with said rotor for balancing the torque reaction thereof, a pair of horizontally spaced engine driven auxiliary sustaining rotors arranged to rotate in substantially the same plane about spaced axes parallel to said main rotor axis and located on the opposite side of said center of gravity from said main rotor axis and spaced a greater distance in said horizontal plane from said center of gravity than said main rotor axis and symmetrically located relative to said main rotor, means for changing the pitch of said main rotor, means operatively connected with said main rotor pitch changing means and operated thereby for simultaneously changing the pitch of both of said auxiliary rotors in the same direction and means for independently simultaneously changing the pitch of said auxiliary rotors in the same or opposite directions.

11. In an aircraft having a main sustaining rotor, one or more auxiliary sustaining rotors, and one or more directional control rotors, means operatively connected with its respective rotor for changing the pitch of said rotors, manually operable means connected with said pitch changing means for controlling the pitch changing movements of said rotors, and means operatively connecting the pitch control means of said main rotor with the pitch control means of said auxiliary rotors automatically synchronizing the pitch changes of said auxiliary sustaining rotors with pitch changes of said main sustaining rotor, an engine operatively connected with and driving said rotors, and means operatively connected with and operative by movements of said pitch control means to automatically synchronize the power output changes of said engine with the pitch variations of said sustaining rotors.

12. In an aircraft having a main sustaining rotor, one or more auxiliary sustaining rotors, and one or more directional control rotors, means operatively connected with its respective rotor for changing the pitch of said rotors, manually operable means connected with said pitch changing means for controlling the pitch changing movements of said rotors, and means operatively connecting the pitch control means of said main rotor with the pitch control means of said auxiliary rotors automatically synchronizing the pitch changes of said auxiliary sustaining rotors with pitch changes of said main sustaining rotor, power means operatively connected with and driving said rotors, and means operatively connected with and operative by movements of said pitch control means to automatically synchronize the power output changes of said power means with the pitch variations of said sustaining rotors so as to maintain the rotor speed substantially constant during rotor pitch changes, and manually operable means for varying the power output of said power means.

13. In an aircraft, in combination, a sustaining rotor, means operatively connected with said rotor for changing the pitch thereof, a control rotor, means operatively connected with said control rotor for changing the pitch thereof, an engine operatively connected with said rotors supplying power to said rotors, control means operatively connected with said engine, and means movable by said main rotor pitch changing means interconnecting both of said pitch changing means and said engine control means and operating the pitch changing means of said control rotor and said engine control means upon a movement of said sustaining rotor pitch changing means.

14. In a direct-lift aircraft having three triangularly arranged continuously operating sustaining rotors, one of which is a main sustaining rotor disposed at the forward apex of said triangle, and at least one directional control rotor, means for changing the pitch of said main sustaining rotor, means for changing the pitch of the control rotor, and means for simultaneously changing the pitch of the two remaining sustaining rotors in the same direction to control the pitching movements of said aircraft, or in opposite directions to control the rolling movements of said aircraft.

15. In a direct-lift aircraft having three triangularly arranged sustaining rotors, and at least one control rotor, means for changing the pitch of one of the sustaining rotors, means for changing the pitch of the control rotor, means for simultaneously changing the pitch of the two remaining sustaining rotors in the same or in opposite directions, and means movable with the pitch changing means of said one sustaining rotor interconnecting the several pitch changing mechanisms to change the pitch of the remaining sustaining rotors and the control rotor upon a change in the pitch of said one sustaining rotor.

16. In a direct-lift aircraft having three triangularly arranged sustaining rotors and a control rotor permanently geared together for simultaneous rotation, means operatively connected with one sustaining rotor for changing the pitch thereof at will, means operatively connected with the other two sustaining rotors for simultaneously changing the pitch thereof at will, means operatively connected with the control rotor for changing the pitch thereof at will, and common control means operatively associated with said one sustaining rotor pitch changing means and operatively associated with the other sustaining rotors and the control rotor and actuated by movement of the pitch changing means of said one sustaining rotor to simultaneously change the pitch of all of the other rotors.

17. In an aircraft, in combination, a sustaining rotor, means operatively connected with said rotor for changing the pitch thereof, a control rotor, means operatively connected with said control rotor for changing the pitch thereof, an engine operatively connected with said rotors supplying power to said rotors, control means operatively connected with said engine, and means movable by said main rotor pitch changing means interconnecting both of said pitch changing means and said engine control means and including means operating the pitch changing means of said control rotor to increase its pitch and said engine control means to increase the engine power upon a pitch increasing movement of said sustaining rotor pitch changing means.

18. In an aircraft, in combination, a sustaining rotor, means operatively connected with said rotor for changing the pitch thereof, a torque-reaction-balancing propeller mounted to rotate in a plane parallel to the axis of rotation of said sustaining rotor, means operatively connected with said torque-reaction-balancing propeller for changing the pitch thereof, an engine operatively connected with and supplying power to said rotor and to said propeller, control means operatively connected with said engine, and means movable by said main rotor pitch changing means interconnecting both of said pitch changing means and said engine control means and operating the pitch changing means of said torque-reaction-balancing propeller and said engine control means upon a movement of said sustaining rotor pitch changing means.

19. In an aircraft, in combination, a sustaining rotor, means operatively connected with said rotor for changing the pitch thereof, a torque-reaction-balancing propeller mounted to rotate in a plane parallel to the axis of rotation of said sustaining rotor, means operatively connected with said torque-reaction-balancing propeller for changing the pitch thereof, an engine operatively connected with and supplying power to said rotor and said propeller, engine power control means operatively connected with said engine, and means movable by said main rotor pitch changing means interconnecting both of said pitch changing means and said engine power control means and operating the pitch changing means of said torque-reaction-balancing propeller and said engine power control means upon a movement of said sustaining rotor pitch changing means.

20. In an aircraft, in combination, a sustaining rotor, means operatively connected with said rotor for changing the pitch thereof, a control rotor, means operatively connected with said control rotor for changing the pitch thereof, an engine operatively connected with said rotors supplying power to said rotors, engine throttle control means operatively connected with said engine, and means movable by said main rotor pitch changing means interconnecting both of said pitch changing means and said engine throttle control means and operating the pitch changing means of said control rotor and said engine throttle control means upon a movement of said sustaining rotor pitch changing means.

21. In an aircraft, in combination, a sustaining rotor, means operatively connected with said rotor for changing the pitch thereof, a torque-reaction-balancing propeller, means operatively connected with said torque-reaction-balancing propeller for changing the pitch thereof, an engine operatively connected with and supplying power to said rotor and said propeller, an engine throttle for said engine, and means interconnecting the pitch changing means of said rotor, the pitch changing means of said torque-reaction-balancing propeller, and the engine throttle, and movable by said main rotor pitch changing means and operating the propeller pitch changing means to increase the pitch of the torque-reaction-balancing propeller and the engine throttle to open said throttle upon a pitch increasing movement of the sustaining rotor pitch changing means.

22. In an aircraft, in combination, a sustaining rotor having a plurality of blades, means operatively connected with said rotor for simultaneously changing the pitch of all the blades, a torque-reaction-balancing propeller, means operatively connected with said torque-reaction-balancing propeller for changing the pitch thereof, an engine operatively connected with and supplying power to said rotor and said propeller, an engine throttle for said engine, and means interconnecting the pitch changing means of said rotor, the pitch changing means of said torque-reaction-balancing propeller, and the engine throttle, and movable by said main rotor pitch changing means and operating the propeller pitch changing means to increase the pitch of the torque-reaction-balancing propeller and the engine throttle to open the same upon a pitch increasing movement of the sustaining rotor pitch changing means.

IGOR I. SIKORSKY.